(12) United States Patent
Yoshida

(10) Patent No.: US 9,193,390 B1
(45) Date of Patent: Nov. 24, 2015

(54) FRONT COWL MEMBER FOR VEHICLE

(71) Applicant: Kobe Steel, Ltd., Kobe-shi (JP)

(72) Inventor: Masatoshi Yoshida, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 0 days.

(21) Appl. No.: 14/465,164

(22) Filed: Aug. 21, 2014

(51) Int. Cl.
B62D 25/08 (2006.01)
B62D 29/00 (2006.01)

(52) U.S. Cl.
CPC ............ *B62D 25/081* (2013.01); *B62D 29/008* (2013.01)

(58) Field of Classification Search
CPC .............................. B60R 21/34; B62D 25/081
USPC ............................................ 296/192, 187.04
See application file for complete search history.

(56) References Cited

U.S. PATENT DOCUMENTS

| 2006/0186704 A1* | 8/2006 | Sakai et al. .................... 296/192 |
| 2006/0284432 A1 | 12/2006 | Hashimoto et al. |
| 2007/0246971 A1* | 10/2007 | Hanakawa et al. ....... 296/203.01 |
| 2009/0038365 A1 | 2/2009 | Yoshida et al. |
| 2013/0175827 A1 | 7/2013 | Hashimoto et al. |
| 2014/0015285 A1 | 1/2014 | Ishitobi et al. |
| 2015/0035318 A1* | 2/2015 | Serizawa et al. ......... 296/187.09 |

FOREIGN PATENT DOCUMENTS

| JP | 9-202265 | 8/1997 |
| JP | 4338194 | 10/2009 |
| JP | 2013-166424 | 8/2013 |

* cited by examiner

*Primary Examiner* — Jason S Morrow
(74) *Attorney, Agent, or Firm* — Oblon, McClelland, Maier & Neustadt, L.L.P.

(57) ABSTRACT

A front cowl for a vehicle is a press molded product of an aluminum extrusion shaped member. The press molded product has a front flange portion extending in a vehicle width direction and located on a front side of a vehicle body, a vertical wall portion connected to a vehicle-body rear end of the front flange portion so as to extend in a vehicle-body downward direction, and a rear flange portion connected to a lower end of the vertical wall portion so as to extend to a rear side of the vehicle. The rear flange portion is formed into a gutter shape with an opening in an upper direction. A bolt joining portion for joining to another member with a bolt is formed on one region of the front flange portion. The bolt joining portion has a thickness thicker than that of the rear flange portion.

7 Claims, 9 Drawing Sheets

FRONT COWL MEMBER FOR VEHICLE

BACKGROUND OF THE INVENTION

1. Field of the Invention

The present invention relates to a front cowl member for a vehicle, and more particularly concerns a front cowl member that is excellent in the rigidity and deformation resistant strength and has a high weight reducing effect.

2. Description of Related Art

At the vehicle body of a vehicle and so on, a part referred to as a front cowl member is disposed on the underside of a hood panel rear portion on the vehicle front side of a front glass in a manner so as to extend in the vehicle width directions.

As has been conventionally well-known, this front cowl member is arranged so as to extend substantially in a horizontal direction relative to a vehicle body and in parallel with a vehicle width direction, and its end portion is connected to a suspension tower and its vehicle body rear side is connected to the vehicle body such as a dash panel, so that this arrangement exerts a function of a trough so as to prevent water such as rain water flowing down from the vehicle upper direction from invading into an engine room. Therefore, most of the front cowl members are designed into substantially a U-letter shape or L-letter shape in the cross-sectional view, with an opening being formed in an upward direction of the vehicle, and if necessary, various functional members, such as reinforcing members and wiper pivots, are coupled thereto.

This front cowl member couples suspension towers that receive input loads from the right and left tires of the vehicle to each other; therefore, it also has a function for improving the vehicle body rigidity at the time of traveling. For this reason, this part is also required for high twisting and bending rigidity relative to loads mainly applied in the vehicle longitudinal directions, as well as for high compression rigidity and strength against compression force exerted in the vehicle width directions. Moreover, from the viewpoint of reducing the weight of the vehicle, after achieving these rigidity and strength as well as further achieving functions for satisfying protective functions for pedestrians, the light weight of the vehicle is further demanded.

Since aluminum alloys are light in comparison with steel sheets that have been conventionally used, these are expected to be applied to the frame members. However, since these have problems in that material costs are high in comparison with those of the steel sheets, with low processability, and in that their joining costs are high, the practical use of these has not been progressed so much, and there are only few application cases to the cowl member.

As shown in FIG. 8, JP 9-202265 A discloses a cowl box 20 constituted by a cowl top panel 22 made of a plate member and a cowl box member 21 installed on the rear upper portion of this member. An extrusion member made of a light alloy is used as the cowl box member 21 for supporting a front glass 26. However, there are no prior arts in which a light alloy extrusion member made of an aluminum alloy or the like is applied to a front cowl member main body that has a function as a trough. A wiper pivot is coupled to the front cowl main body. FIG. 8 is a cross-sectional view that shows the vehicle-body cowl box unit of JP 9-202265 A when its cross section is seen in the vehicle width direction.

One of the reasons for this problem is that the fracture limit of the aluminum alloy materials is lower than that of the steel sheet. In the front cowl member, a shape drastically changing portion is formed, in particular, on each of the vehicle width direction end portions in most cases, in order to prevent it from being interfered with other members, such as suspension towers or the like, and in the case of the aluminum alloy, many limitations in the angle and height of vertical walls or the radius or the like of the corners of shoulder portions are imposed in order to suppress molding failures, such as fractures, wrinkles, or the like, with the result that a problem arises in which it is difficult to properly maintain the moldability at the shape drastically changing portion.

Moreover, in recent years, in order to ensure the protective functions for pedestrians, a breaking point or the like for use in forming a weaker portion is formed on one portion of the front cowl member in some cases as disclosed in JP 4338194 B.

However, in the case of the aluminum alloy having a small local expansion, when the breaking point or the like is locally formed, a problem tends to arise in that fractures easily occur due to concentration of distortions. Moreover, even in the case where an aluminum extrusion shaped member is adopted as the front cowl member, since its plate thickness is thicker in comparison with a thin steel member as disclosed in JP 4338194 B, and since the proof stress of material is also high, the resulting problem is that the deformation resistant strength becomes higher. For this reason, another problem is raised in that only the formation of the breaking point, such as a shelf or the like, fails to ensure predetermined functions for protecting pedestrians.

On the other hand, the front cowl member is required for bending, twisting and compression rigidity relative to load inputs from the suspension tower. In order to effectively increase the rigidity and strength while maintaining the weight reducing effect, in particular, it is most effective to increase the fastening strength and rigidity of a flange portion on the part front side to be coupled to the suspension tower. For this reason, in general-use steel sheet products, a reinforcing member is joined to the flange portion on the front side and utilized in most cases. However, even if the same effects are obtained by simply replacing the member with the aluminum alloy plate, the material costs and joining costs become higher, and another problem arises in that its merit is small from the viewpoint of manufacturing processes and so on.

SUMMARY OF THE INVENTION

Therefore, the object of the present invention is to provide a front cowl member made of an aluminum alloy that makes it possible to ensure deformation resistant strength and rigidity while suppressing an increase in weight, has a light weight and can be manufactured at low costs.

In order to achieve the above-mentioned object, on the basis of the findings that upon manufacturing a front cowl member made of an aluminum alloy, by using an aluminum extrusion shaped member as a material, as well as by optimizing the thickness of a constituent portion of the cowl member, both of the light-weight and proper rigidity can be ensured, the present inventors have achieved the present invention.

A first aspect of the present invention provides a front cowl member for a vehicle which extends substantially in a horizontal direction relative to a vehicle body and substantially in parallel with a vehicle width direction. The front cowl comprises a press molded product of an aluminum extrusion shaped member. The press molded product comprises a front flange portion that extends in the vehicle width direction and is located on a front side of the vehicle body, a vertical wall portion that is connected to a vehicle-body rear end of the front flange portion so as to extend in a vehicle-body downward direction, and a rear flange portion that is connected to a lower end of the vertical wall portion so as to extend to a rear side of the vehicle. When seen on a cross section orthogonal to the vehicle-width direction, the rear flange portion is formed into a gutter shape in a cross-sectional shape with an opening in an upper direction. A bolt joining portion for use in joining to another member with a bolt is formed on one region of the front flange portion. The bolt joining portion has a thickness thicker than that of the rear flange portion.

A second aspect of the present invention provides the front cowl according to the first aspect, wherein the vertical wall portion has a thickness thinner than a thickness of the bolt joining portion of the front flange portion and thicker than the thickness of the rear flange portion.

A third aspect of the present invention provides the front cowl according to the first or second aspect, wherein, on one region of the rear flange portion, a bolt joining face thicker than a thickness of the other regions of the rear flange portion is formed, and wherein a bolt hole capable of being coupled to the vehicle body with a bolt is formed on the bolt joining face.

A fourth aspect of the present invention provides the front cowl according to any one of the first to third aspects, wherein any one of the front flange portion, the vertical wall portion, and the rear flange portion has a slanting surface formed on a thick plate face with the thickness thereof being changed, and wherein slanting surface is designed to have an angle change on a thick plate cross section in a range from 5 degrees or more to 45 degrees or less.

The fifth aspect of the present invention provides the front cowl according to any one of the first to fourth aspects, wherein when the aluminum extrusion shaped member is molded, a shelf portion extending in a front-to-rear direction of the vehicle body is formed in a middle region in a height direction of the vertical wall portion, with a weakened portion being formed on the vertical wall portion on the front side of the vehicle body or on a vehicle-body upper side of the shelf portion.

The sixth aspect of the present invention provides the front cowl according to any one of the first to fifth aspects, wherein the aluminum extrusion shaped member is made of an aluminum alloy of any one of 5000 series, 6000 series, and 7000 series.

In accordance with the front cowl member for a vehicle of the first aspect of the present invention, the front cowl extends substantially in the horizontal direction relative to the vehicle body and substantially in parallel with the vehicle width direction. The front cowl comprises the press molded product of the aluminum extrusion shaped member. The press molded product comprises the front flange portion that extends in the vehicle width direction and is located on the front side of the vehicle body, the vertical wall portion that is connected to the vehicle-body rear end of the front flange portion so as to extend in the vehicle-body downward direction, and the rear flange portion that is connected to the lower end of the vertical wall portion so as to extend to a rear side of the vehicle. When seen on a cross section orthogonal to the vehicle-width direction, the rear flange portion is formed into the gutter shape in the cross-sectional shape with the opening in an upper direction. The bolt joining portion for use in joining to another member with the bolt is formed on one region of the front flange portion. The bolt joining portion has a thickness thicker than that of the rear flange portion.

As a result, by coupling the front flange portion to the suspension tower serving as a load input point, it becomes possible to ensure bending and twisting rigidity or compression rigidity and strength of the part without using any reinforcing member. For this reason, in comparison with a conventional steel sheet structure having a reinforcing member, it is possible to further cut costs by reducing the number of parts and welding costs.

Moreover, by using an aluminum extrusion shaped member as a material, the part is configured by a press molding process of a different thickness extrusion shaped member so that it becomes possible to provide a thickness difference within a cross section, without using a joining, forging or cutting process, and also to ensure a product performance that is comparatively uniform within the cross section at low costs, without causing material property changes due to weld-softening and strong plastic processing. Furthermore, since the extrusion shaped member of an open cross-sectional type without having any closed cross-sectional portion is used, it is possible to clamp both surfaces of the product by metal molds at the press bottom dead point, and consequently to ensure shape precision.

In accordance with the front cowl member for a vehicle relating to the second aspect of the present invention, the vertical wall portion has a thickness thinner than a thickness of the bolt joining portion of the front flange portion and thicker than the thickness of the rear flange portion. Therefore, in the case where a compression load is applied from the front flange portion forming the coupling portion to the suspension tower in a vehicle width direction, since the front cowl member rear side is coupled to the vehicle body, the compression force becomes higher as the pressed portion comes closer to the vehicle-body front side; thus, the thickness of the bolt joining portion of the front flange placed on the front-most side is made thickest, the thickness of the vertical wall portion is made next thicker, and the thickness of the rear flange is made thinnest so that this configuration is preferable from the viewpoint of ensuring both of the light weight and rigidity.

In accordance with the vehicle-use front cowl member relating to the third aspect of the present invention, on one region of the rear flange portion, the bolt joining face thicker than the thickness of the other regions of the rear flange portion is formed. The bolt hole capable of being coupled to the vehicle body with the bolt is formed on the bolt joining face. Therefore, it becomes possible to achieve both of the light weight and improved rigidity of the rear flange portion which is susceptible to a local stress when a bending, twisting or compression load is applied thereto.

Moreover, in accordance with the front cowl member for a vehicle relating to the fourth aspect of the present invention, any one of the front flange portion, the vertical wall portion, and the rear flange portion has a slanting surface formed on the thick plate face with the thickness thereof being changed. The slanting surface is designed to have an angle change on a thick plate cross section in a range from 5 degrees or more to 45 degrees or less. Therefore, the contact load between the aluminum molding metal mold and the aluminum alloy material is dispersed so that at the time of molding, the concentration of distortions can be effectively alleviated, and the breaking deformation can be effectively prevented.

Furthermore, in accordance with the front cowl member for a vehicle relating to the fifth aspect of the present invention, when the aluminum extrusion shaped member is molded, a shelf portion extending in a front-to-rear direction of the vehicle body is formed in a middle region in a height direction of the vertical wall portion, with a weakened portion being formed on the vertical wall portion on the front side of the vehicle body or on a vehicle-body upper side of the shelf portion. Since this weakened portion is prepared so that upon collision with a pedestrian, a bending deformation, a bucket buckling, a fracture or the like occurs easily at the weakened portion serving as the starting point, it is possible to effectively alleviate an impact applied onto the head of the pedestrian by reducing the load at the time of the deformation. Simultaneously, by forming this weakened portion in an upper direction from the shelf, it is possible to prevent a fracture from occurring on the weakened portion as the starting point at the time of molding the aluminum extrusion shaped member.

The present front cowl member for a vehicle is formed as a press-molded product of a thickness different extrusion shaped member. Therefore, from the viewpoint of allowing the front cowl member to have a water-draining function as a trough, it is necessary to dispose the cowl member bottom face of the two end sides on the vehicle lower side in comparison with the center portion of the vehicle width. In this case, the height of the vertical wall portion in this region needs to be made higher by using a press-molding process. However, in the case where no shelf portion is formed on the vertical wall portion and the breaking point or the thin thickness portion is formed on the vertical wall portion as the weakened portion, the weakened portion tends to be primarily deformed even at the time of press-molding, causing a problem that the weakened portion is easily fractured.

Moreover, even in the case of the installation of the shelf portion, if the breaking point or the thin thickness portion forming the weakened portion is formed on a lower side from the shelf portion, that is, on a region that directly receives a tensile force of the press-molding, a problem that the weakened portion is easily fractured also arises because the deformation is easily concentrated on this portion. However, in the case where the shelf portion extending in a front-to-rear direction of the vehicle body is formed in a middle region in the height direction of the vertical wall portion, with the weakened portion being formed on the vertical wall portion on the front side of the vehicle body or on a vehicle-body upper side of the shelf portion, since the tensile force at the time of press-molding is supported by a metal mold in association with this shelf portion, the deformation at the weakened portion can be suppressed. For this reason, it is possible to achieve both of the fracture suppression at the time of press-molding and ensuring the pedestrian-protective function of the product that has been manufactured.

Moreover, in accordance with the front cowl member for a vehicle relating to the sixth aspect of the present invention, since the aluminum extrusion shaped member is made of an aluminum alloy of any one of 5000 series, 6000 series, and 7000 series, it is possible to ensure sufficient strength and rigidity required for a front cowl member for a vehicle as a material.

BRIEF DESCRIPTION OF THE DRAWINGS

These and other objects and features of the present invention will become apparent from the following description taken in conjunction with preferred embodiments thereof with reference to the accompanying drawings, in which:

FIG. 2A is a view showing a vertical cross section A taken along an X-direction of FIG. 1, and FIG. 2B is a view showing a vertical cross section B taken along a Y-direction of FIG. 1;

FIG. 6A is a view showing a vertical cross section A taken along an X-direction of FIG. 5, and FIG. 6B is a view showing a vertical cross section B taken along a Y-direction of FIG. 5;

FIG. 7A shows a state in which a vehicle on which the present front cowl member is mounted comes into contact with a pedestrian or the like, and the human body gets on the hood, and FIG. 7B shows a state in which the front cowl member is broken at a weakened portion, and recessed together with the hood.

DESCRIPTION OF THE PREFERRED EMBODIMENTS

Figure 1:
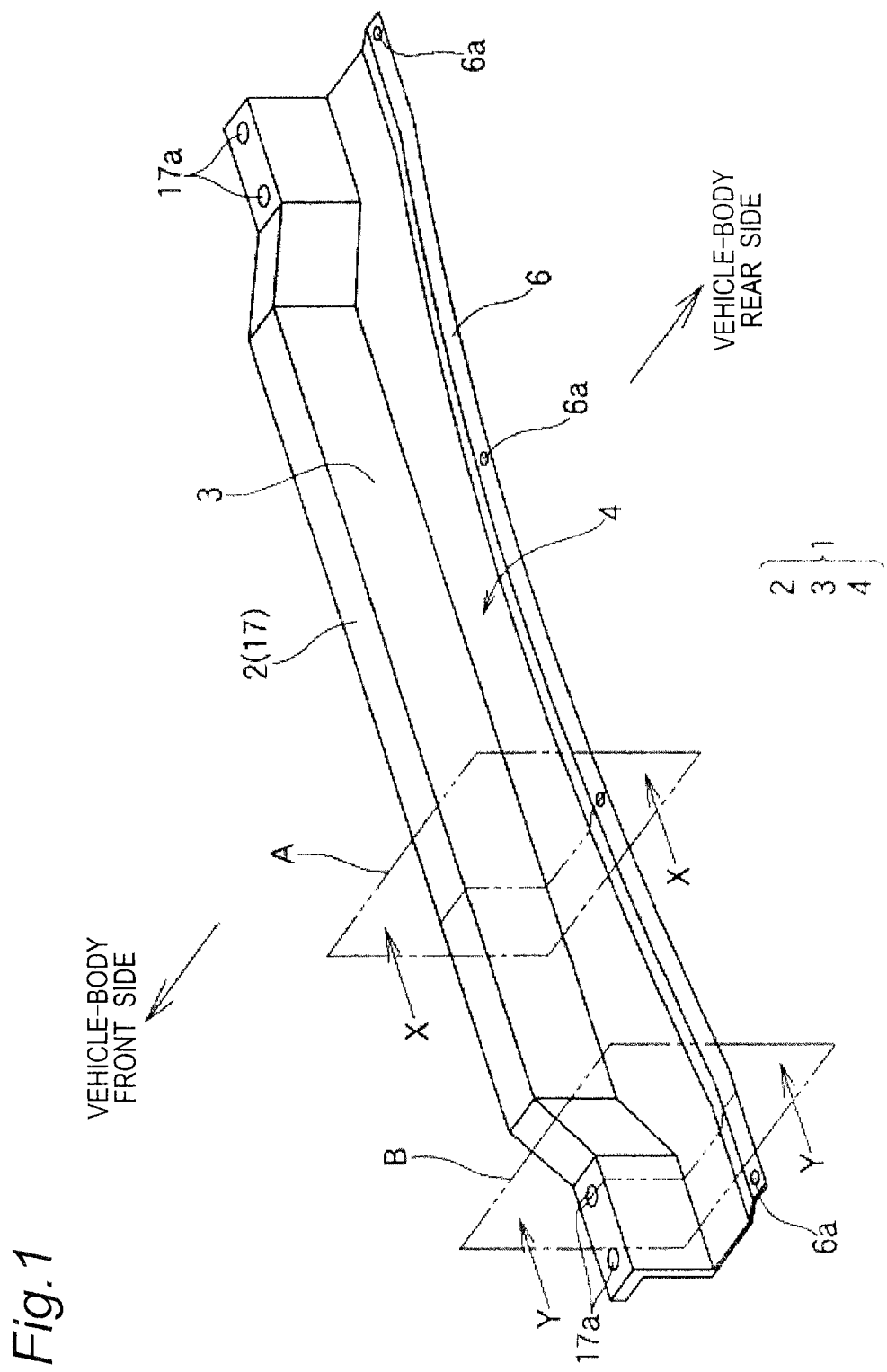
FIG. 1 is a schematic perspective view showing a front cowl member for a vehicle in accordance with a first embodiment of the present invention.
Figure 2A:
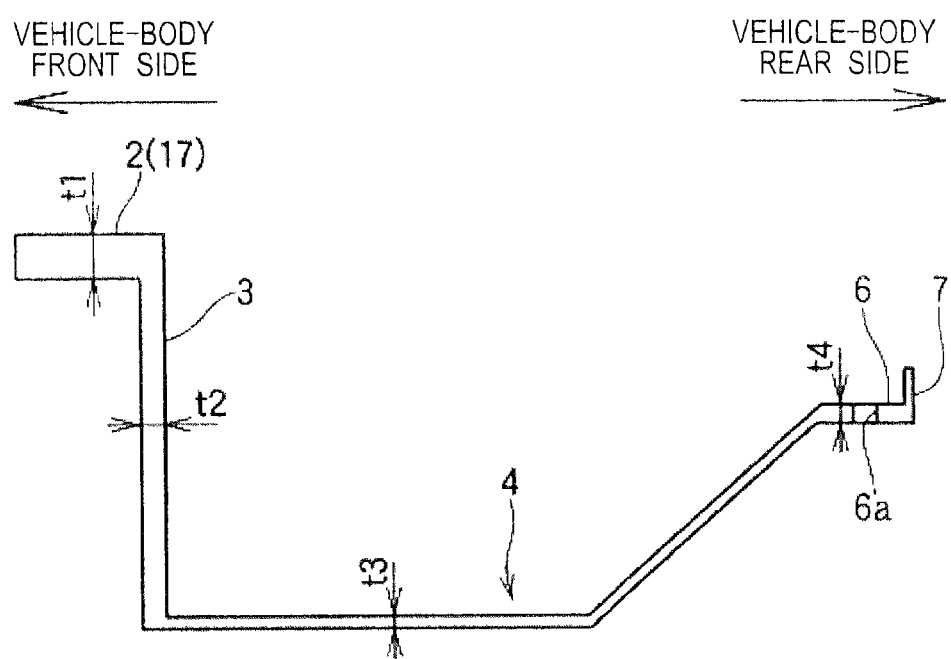
FIGS. 2A and 2B are schematic cross-sectional views showing cross sections of the front cowl member for a vehicle of FIG. 1 when seen in the vehicle width direction where
Figure 2B:
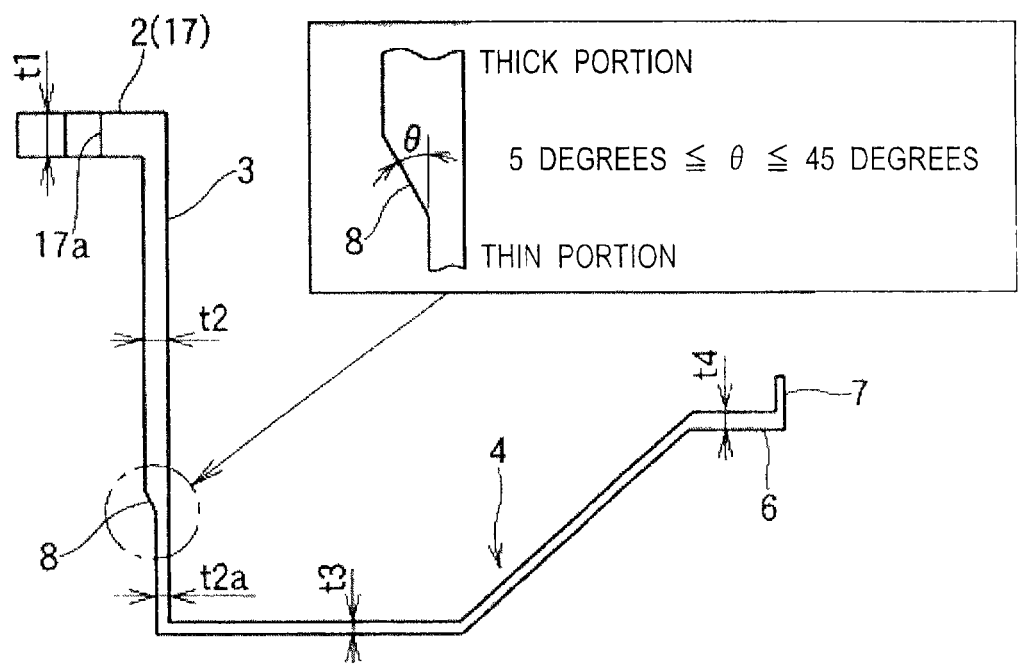
Figure 3:
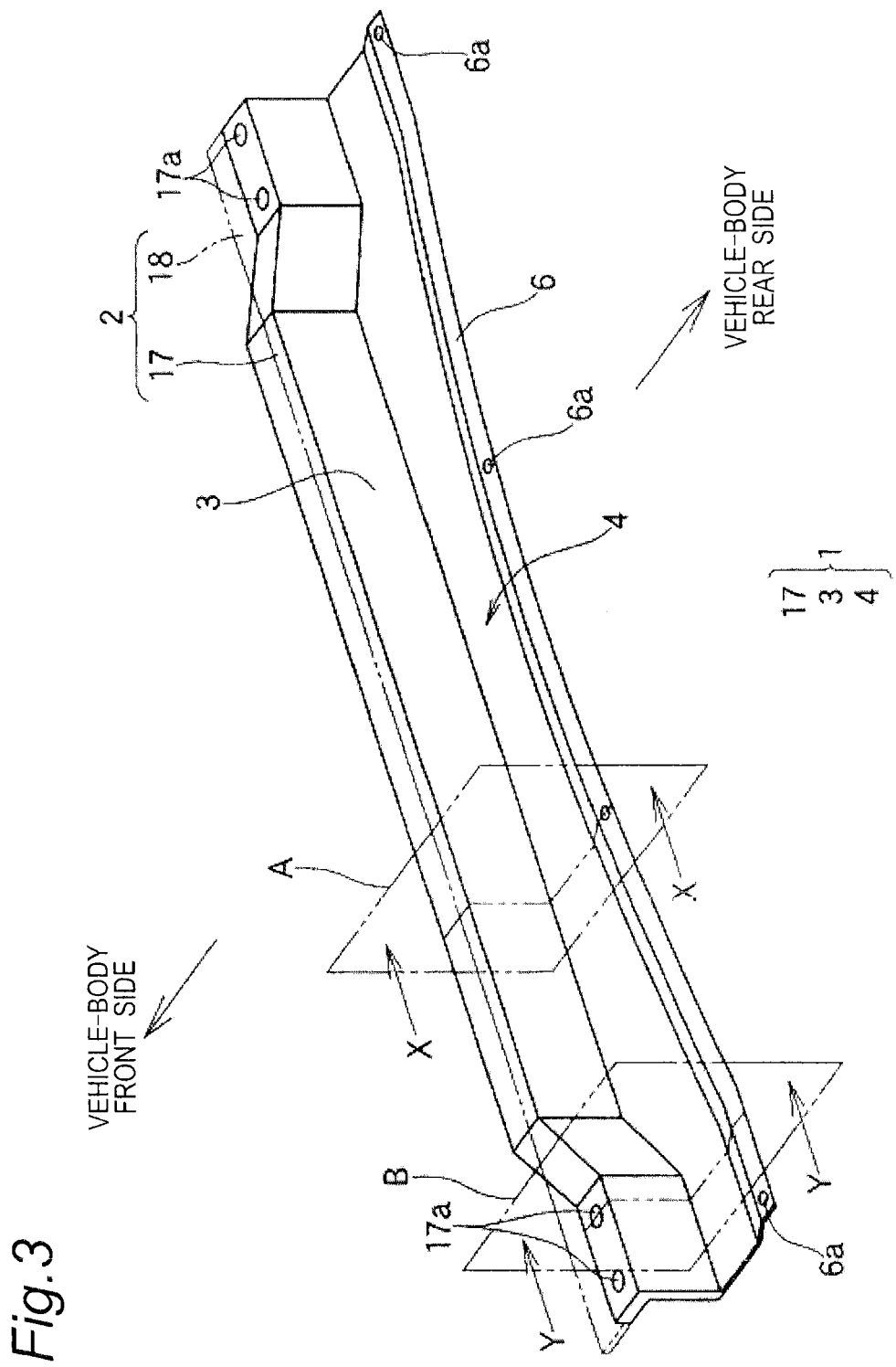
FIG. 3 is a schematic perspective view showing a front cowl member for a vehicle in accordance with another aspect of the first embodiment of the present invention.
Figure 4:
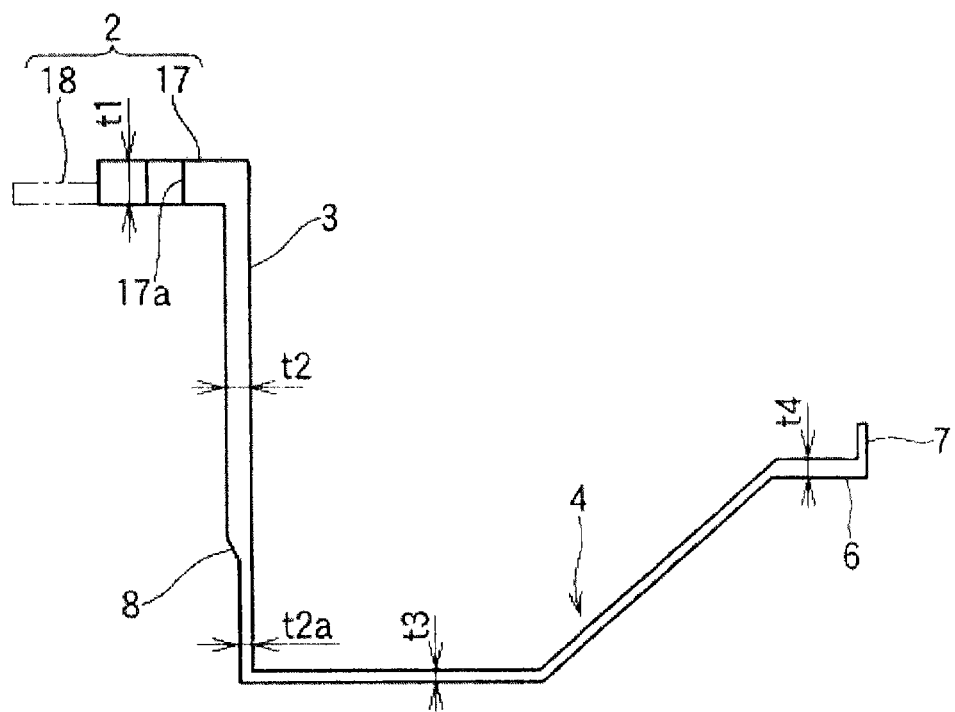
FIG. 4 is a schematic cross-sectional view showing a cross section of the front cowl member for a vehicle of FIG. 3 when seen in the vehicle width direction, which corresponds to a view showing a vertical cross section B taken along a Y-direction of FIG. 3.

First, referring to attached FIGS. 1 to 4, the following description will describe a front cowl member for a vehicle relating to first embodiment of the present invention. FIG. 1 is a schematic perspective view showing a front cowl member for a vehicle in accordance with the first embodiment of the present invention. FIGS. 2A and 2B are schematic cross-sectional views showing cross sections of the front cowl member for a vehicle of FIG. 1 when seen in the vehicle width direction; and FIG. 2A is a view showing a vertical cross section A taken along an X-direction of FIG. 1; and FIG. 2B is a view showing a vertical cross section B taken along a Y-direction of FIG. 1. FIG. 3 is a schematic perspective view showing the front cowl member for a vehicle in accordance with another aspect of the first embodiment of the present invention. FIG. 4 is a schematic cross-sectional view showing a cross section of the front cowl member for a vehicle of FIG. 3 when seen in the vehicle width direction, which corresponds to a view showing a vertical cross section B taken along a Y-direction of FIG. 3. Additionally, in FIG. 1, a stopper is omitted from the illustration.

As shown in FIG. 1, the front cowl member for a vehicle relating to the first embodiment of the present invention, which relates to a front cowl member for a vehicle that extends substantially in a horizontal direction relative to a vehicle body and substantially in parallel with a vehicle width direction, is formed by a press molded product 1 that is press-molded in the longitudinal direction of the vehicle body by using aluminum extrusion shaped members as materials, which include a front flange portion 2 that extends in vehicle width directions, and is located on the front side of the vehicle body, a vertical wall portion 3 that is connected from the vehicle-body rear end of the front flange portion 2 toward the vehicle-body downward direction, and a rear flange portion 4 that is coupled from the lower end of the vertical wall portion 3 toward the vehicle-body rear side.

In this case, the above-mentioned "substantially in parallel with the vehicle width direction and substantially in a horizontal direction relative to the vehicle body" refers to the fact that along a hood of an engine room that is formed into a convex shape in accordance with a curvature variation in the vehicle width directions, the front cowl member for a vehicle is also formed into a convex shape in accordance with the curvature variation in the vehicle width directions, while the front cowl member is formed in a horizontal state relative to the hood on average, and is also formed in parallel with the vehicle-width directions on average.

Moreover, on the front flange portion 2, a bolt joining portion 17 is formed along the vehicle width directions, and a thickness t1 of this bolt joining portion 17 is designed to be thicker than a thickness t3 of the rear flange portion 4. On the other hand, bolt holes 17a are respectively formed on the two ends in the vehicle width directions of the bolt joining portion 17 so that it is designed so as to be combined with a suspension tower, not shown, that is attached to the vehicle body so as to support the upper portion of a front suspension device with bolts. In this case, the bolt joining portion 17 forms completely the same portion as the flange portion 2.

As a result, by coupling the bolt joining portion 17 of the front flange portion 2 to the suspension tower serving as a load input point, it becomes possible to ensure bending and twisting rigidity or compression rigidity and strength of the part without using any reinforcing member. For this reason, in comparison with a conventional steel sheet structure having a reinforcing member, it is possible to further cut costs by reducing the number of parts and welding costs.

On the other hand, as shown in FIG. 2, the rear flange portion 4 is formed into a trough shape in its cross-sectional shape (substantially a U-letter cross-sectional shape) with an opening in the upward direction when the rear flange portion 4 is seen in a cross-sectional view in the vehicle width directions. As a result, the rear flange portion 4 functions as a trough for preventing water from invading into an engine room; thus, the front cowl member for a vehicle in accordance with the first embodiment of the present invention has such a configuration as to be integrated into the press-molded product 1 by using aluminum extrusion shaped members as materials, which include the front flange portion 2, the vertical wall portion 3 and the rear flange portion 4 so that it is possible to cut costs by reducing the number of parts as well as by eliminating the necessity of welding, and also to increase the rigidity and strength in comparison with conventional point-contact parts of plate member molded products.

On one portion on the vehicle-body rear side of the rear flange portion 4, a bolt joining face 6 having a thickness t4 thicker than the thickness t3 of the other regions of the rear flange portion 4 is formed, and preferably, a stopper 7 is further formed at the rear end of the bolt joining face 6. The functions of the stopper 7 will be described later. Thus, by inserting bolts through bolt holes 6a formed on the bolt joining face 6, the press-molded product 1 is designed to be coupled to a dash panel of the vehicle body, not shown.

As a result, it becomes possible to achieve both of the light weight and improved rigidity of the rear flange portion 4 which is susceptible to a local stress when a bending, twisting or compression load is applied thereto. Additionally, from the viewpoint of using aluminum extrusion shaped members, in the case where the above-mentioned structure is adopted, it is important to form the bolt joining face 6 relative to the vehicle body so as to allow the bolt joining portion on the vehicle-body rear side to be located on the same cross-sectional position along an axis line direction (shaped member longitudinal direction), and to form the bolt holes 6a on the joining face 6 thus prepared.

Moreover, the thickness t2 of the vertical wall portion 3 is preferably formed so as to be thinner than the thickness t1 of the bolt joining portion 17 of the front flange portion 2, and also to be thicker than the thickness t3 of the rear flange portion 4. In other words, in the case where a compression load is applied from the front flange portion 2 forming the coupling portion to the suspension tower in a vehicle width direction, since the front cowl member rear side is coupled to the vehicle body, the compression force becomes higher as the pressed portion comes closer to the vehicle-body front side; thus, the thickness t1 of the bolt joining portion 17 of the front flange 2 placed on the furthest front side is made thickest, the thickness t2 of the vertical wall portion 3 is made next thicker, and the thickness t3 of the rear flange portion 4 is made thinnest (t1>t2>t3) so that this configuration is preferable from the viewpoint of ensuring both of the light weight and rigidity.

More specifically, it is preferable to set the thickness t1 of the bolt joining portion 17 of the front flange portion 2 to t1=2 to 6 mm, to set the thickness t3 of the rear flange portion 4 to t3=1 to 2 mm, and also to select the thickness t2 of the vertical wall portion 3 within a range satisfying t1>t2>t3. Moreover, the thickness t1 of the bolt joining portion 17 of the front flange portion 2 is more preferably set to two times or more thicker than the thickness t3 of the rear flange portion 4. As a result, the front cowl member for a vehicle in accordance with the present embodiment greatly contributes to vehicle-body rigidity and strength, when connected to a suspension tower through the front flange portion 2, and on the other hand, the vertical wall portion 3 and the rear flange portion 4 make it possible to achieve light weight when used as a trough for preventing water from invading into the engine room.

In accordance with the front cowl member for a vehicle using aluminum extrusion shaped members as its materials as described in the present invention, it is possible to produce a front cowl member for a vehicle having a complicated cross-sectional shape in which the front flange portion 2, the vertical wall portion 3, the rear flange portion 4, and the bolt joining face 6 having different thicknesses as described above are integrally formed at one time. That is, the great advantage of the embodiment is that different thickness members having mutually different thickness portions in which portions, such as the front flange portion 2 and the bolt joining face 6, that require comparatively high strength and rigidity and portions, such as the rear flange portion 4 and the like, that do not require high strength and rigidity so much, are combined with one another can be integrally produced at one time by using hot extrusion.

Upon molding the aluminum extrusion shaped members, the flange portion 2 does not necessarily need to have completely the same portion as that of the bolt joining portion 17, and as shown in FIGS. 3 and 4, a thin thickness portion 18 may be formed on one region on the vehicle-body front side of the bolt joining portion 17.

That is, in the case where the bolt joining portion 17 of the front flange portion 2 is made thicker, the weight reducing effect becomes greater in most cases. However, if the thickness becomes too much, a problem arises from the viewpoint of application practice in that, for example, a trimming process cannot be carried out on the end faces. In order to avoid this problem, the thickness t1 of the bolt joining portion 17 is made thicker, while, on the other hand, the thin thickness portion 18 is formed on the vehicle-body front side of the bolt joining portion 17, so that aluminum extrusion shaped members are molded.

In the case where the molding process is carried out, with the entire surface of the front flange portion 2 being simply kept in a thick state, processing costs become quite higher upon forming the end shapes by using a laser cutting process or the like. However, in the case where the thin thickness portion 18 is formed on the front-most side of the vehicle-body of the front flange portion 2 in this manner, since it is only necessary to trim the thin thickness portion 18, the thickness of a portion to be separated into scraps is also made thinner, and this configuration is advantageous from the viewpoint of material yield. Thus, after the trimming process, by carrying out a press-molding process, a predetermined press molded product 1 can be obtained.

In the case of a normally-used front cowl member for a vehicle made of steel sheets, a reinforcing member that extends over the entire surface in the vehicle-width directions and a main member are joined to each other, and in particular, the plate thickness in the vicinity of the bolt joining portion to be joined to the suspension tower is thus reinforced. In contrast, the front cowl member for a vehicle relating to the first embodiment of the present invention is constituted by a different thickness extrusion shaped member made of a main member of one sheet plate. In an attempt of ensuring the same rigidity as that of the above-mentioned front cowl member for a vehicle made of steel sheets by simply using the aluminum alloy of one sheet plate, the plate thickness becomes 2.6 mm or more so that an aluminum alloy plate having a comparatively thick thickness is required. However, since the steel sheet is replaced by the aluminum alloy plate, the weight of the corresponding cowl member can be reduced by about 60%.

However, in accordance with the front cowl member for a vehicle relating to the first embodiment of the present invention, by further optimizing the thickness distribution as described above, the weight of the cowl member can be further reduced to above 45% of that made of steel sheets, and in comparison with the structure made of an aluminum alloy of one sheet plate having the same thickness, it is possible to reduce the weight by about 15%.

Moreover, in the case where a slanting surface 8 is formed on the thick plate face of the vertical wall portion 3, with the thickness being changed from a thick side thickness t2 to a thin side thickness t2a, the slanting surface 8 is preferably designed so that its angle change on the plate thickness cross section (an angle difference on cross sections between the plate thickness surface on the thick thickness side or the thin thickness side and the slanting surface) 0 is preferably kept in a range from 5 degrees or more to 45 degrees or less. This achieves that the contact load between an aluminum molding metal mold and that a material can be dispersed so that it becomes possible to alleviate the concentration of distortions and also to prevent a breaking deformation at the time of molding. Additionally, the formation of the slanting surface 8 is not limited on the vertical wall portion 3, and may be formed on at least one or more portions among the front flange portion 2, the vertical wall portion 3 and the rear flange portion 4 forming the present front cowl member.

In accordance with the front cowl member for a vehicle related to the first embodiment, by providing the part as the press molded product 1 made of different thickness extrusion shaped members using aluminum extrusion shaped members as its materials, it becomes possible to form thickness differences within the cross section without the necessity of using a joining, forging or cutting process, and also to ensure product performances that are comparatively uniform within the cross section at low costs, without causing material property changes due to welding softness and plastic processing related to strength. That is, it becomes possible to produce the press molded product 1 by using extrusion shaped materials that are preliminarily set to have a cross-sectional shape close to a final product, such as a Z-letter shape, an L-letter shape, a U-letter shape, or the like, thereby achieving another advantage capable of reducing the amount of protrusion at the rime of molding.

Additionally, in FIGS. 1 to 4, only the basic configuration of the front cowl member for a vehicle relating to the first embodiment of the present invention is shown. However, various reinforcing members, such as joining brackets or the like for use in connecting functional members, such as wiper pivots, may be further joined thereto.

Furthermore, the aforementioned aluminum extrusion shaped member is made of an aluminum alloy of any one of 5000 series, 6000 series, and 7000 series, from the viewpoint of ensuring strength and rigidity required for the front cowl member for a vehicle serving as the material. From the viewpoint of achieving both of corrosion resistance or reliability and material strength, the aluminum alloy of 6000 series is most desirably used.

After having been subjected to a hot extrusion process, these aluminum alloy extrusion shaped members are press-molded, and thereafter, in the case of hot treatment type alloys of 6000 series or 7000 series, these alloys are subjected to a solution treatment and a quenching treatment (temper designation T4) so that the resulting members are used as front cowl members for a vehicle (materials). The quenching treatment can be followed by an aging treatment (temper designation T6), an overaging treatment (temper designation T7) and the like In this case, the surface treatment itself is unnecessary. However, in the case where these are joined to another vehicle member made of steel or iron, such as a suspension tower, a coupling bracket, or the like, it is preferable to insulate aluminum from steel or iron with resin (resin that is compatibly used as a joining material may be used) being interpolated in the joining portion so as to prevent electric corrosion due to an electric potential difference between different materials.

Additionally, in the case where a member, such as a bracket or the like for use in connecting to another part, is joined to one portion of the front cowl member relating to the present invention, an MIG welding, laser welding, or spot welding process, or the like, or a self-pierce rivet process, bolt-joining process or the like may be selected on demand, if necessary, and utilized.

As described above, in accordance with the front cowl member for a vehicle relating to the first embodiment of the present invention, a configuration is provided in which the thickness t1 of the bolt joining portion 17 of the front flange 2 placed on the front-most side is made thickest, the thickness t2 of the vertical wall portion 3 is made next thicker, and the thickness t3 of the rear flange portion 4 is made thinnest (t1>t2>t3); therefore, even in the case where a compression load is applied from the front flange portion 2 forming the coupling portion to the suspension tower in a vehicle width direction, since the front cowl member rear side is coupled to the vehicle body, the resulting configuration makes it possible to endure the compression force that becomes higher as the pressed portion comes closer to the vehicle-body front side, thereby greatly contributing to improving the vehicle rigidity and strength, and on the other hand, it becomes possible to achieve the light weight of the vertical wall portion 3 and the rear flange portion 4 when used as a trough for preventing water from invading into the engine room.

Figure 5:
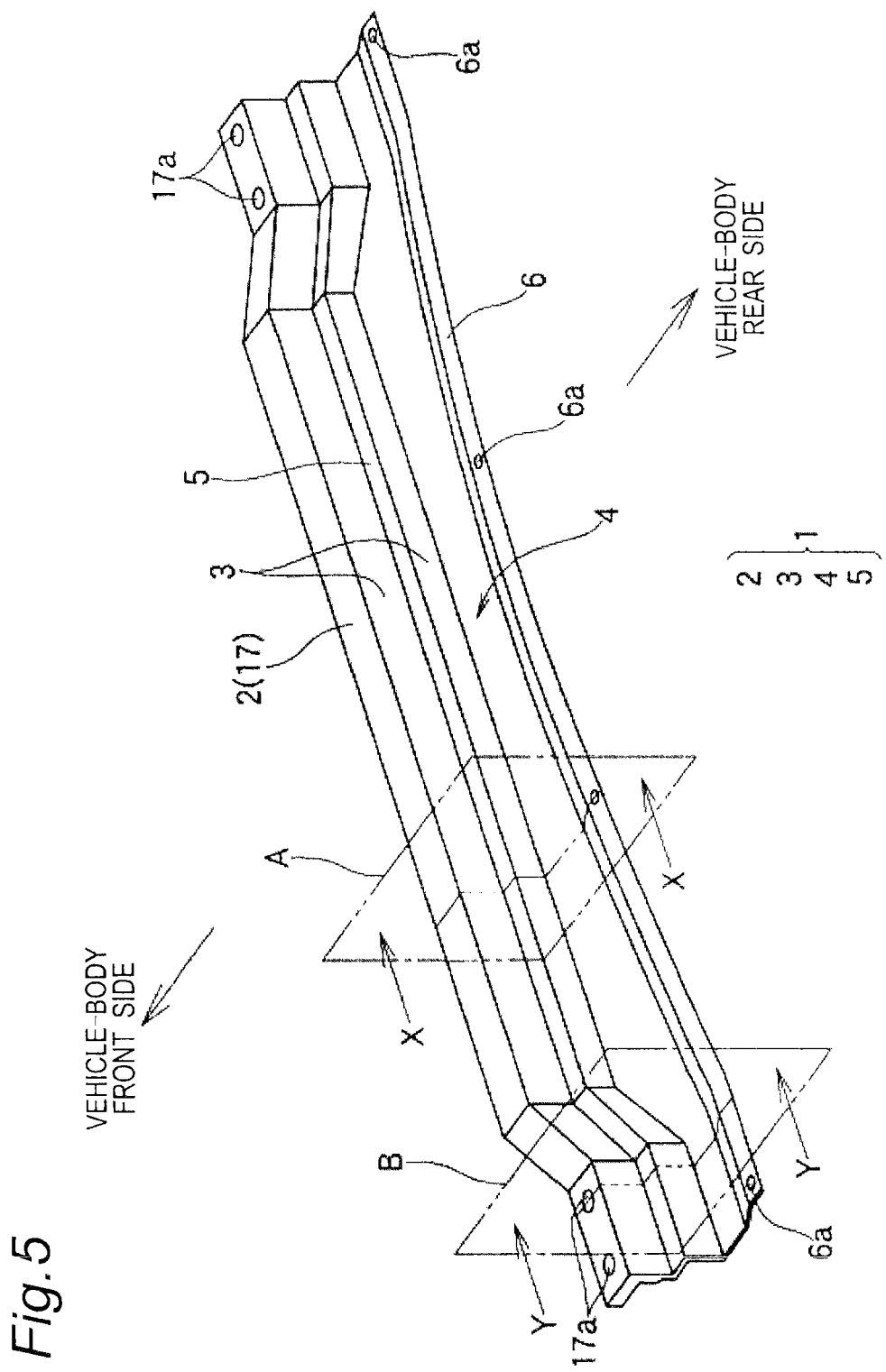
FIG. 5 is a schematic perspective view showing a front cowl member for a vehicle in accordance with the second embodiment of the present invention.
Figure 6A:
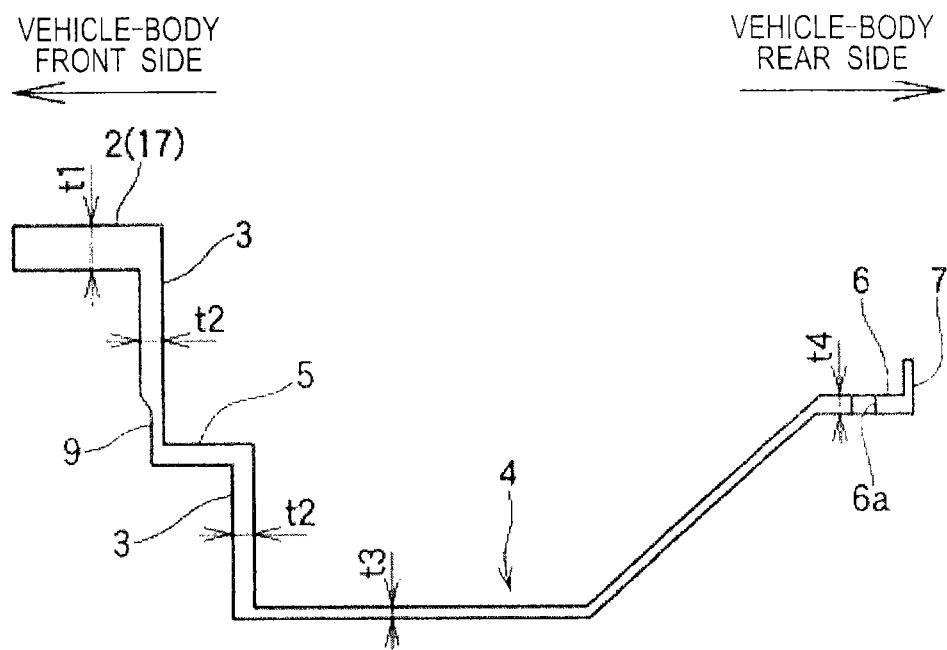
FIGS. 6A and 6B are schematic cross-sectional views showing cross sections of the front cowl member for a vehicle of FIG. 5 when seen in the vehicle width direction where
Figure 6B:
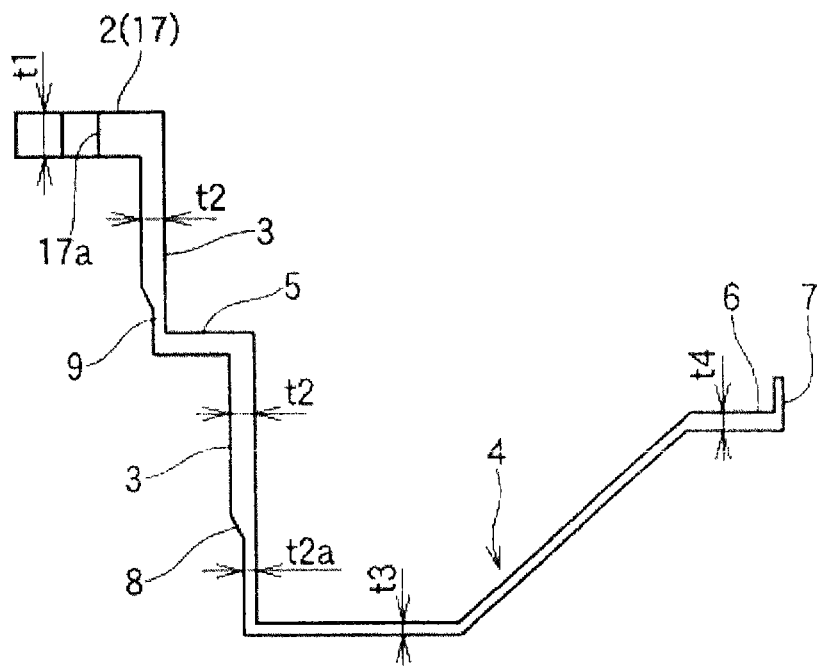

Next, referring to FIGS. 5 and 6A and 6B, the following description will describe a front cowl member for a vehicle member in accordance with a second embodiment of the present invention. FIG. 5 is a schematic perspective view showing the front cowl member for a vehicle in accordance with the second embodiment of the present invention. FIGS. 6A and 6B are schematic cross-sectional views showing cross sections of the front cowl member for a vehicle of FIG. 5 when seen in the vehicle width direction; and FIG. 6A is a view showing a vertical cross section A taken along an X-direction of FIG. 5; and FIG. 6B is a view showing a vertical cross section B taken along a Y-direction of FIG. 5. Additionally, in FIG. 5, a stopper is omitted from the illustration.

The second embodiment of the present invention differs from the aforementioned first embodiment in that a shelf portion is present or not, and the other configurations are completely the same; therefore, the explanation will be given only to the shelf portion.

In other words, in the first embodiment of the present invention, the front cowl member for a vehicle is formed by the press-molded products 1 of aluminum extrusion shaped members including a front flange portion 2 that extends in vehicle width directions, and is located on the front side of the vehicle body, a vertical wall portion 3 that is connected from the vehicle-body rear end of the front flange portion 2 in the vehicle-body downward direction, and a rear flange portion 4 that is coupled to the vehicle-body rear side from the lower end of the vertical wall portion 3.

In contrast, in the second embodiment of the present invention, when the aluminum extrusion shaped member is molded, a shelf portion 5 extending in the front-to-rear direction of the vehicle body is formed in a middle region in the height direction of the vertical wall portion 3, with a weakened portion 9 being formed on the vertical wall portion 3 on the vehicle-body front side or on the further vehicle-body upper side of the shelf portion 5. For this reason, upon molding the aluminum extrusion shaped member, no tensile force is exerted on the weakened portion 9 so that it is possible to prevent a fracture from occurring from the weakened portion 9 as its starting point.

The present vehicle-use front cowl member is configured as the press-molded product 1 including different thickness extrusion shaped members. Therefore, from the viewpoint of allowing the front cowl member to have a water-draining function as a trough, it is necessary to dispose the cowl member bottom face of the two end sides on the vehicle lower side in comparison with the center portion of the vehicle width. In this case, the height of the vertical wall portion 3 in this region needs to be made higher by using a press-molding process. However, in the case where no shelf portion 5 is formed on the vertical wall portion 3 and the breaking point or the thin thickness portion is formed on the vertical wall portion 3 as a weakened portion 9, this weakened portion 9 tends to be primarily deformed even at the time of press-molding, causing a problem that the weakened portion is easily fractured.

Moreover, even in the case of the installation of the shelf portion 5, if the breaking point or the thin thickness portion forming the weakened portion is formed on a lower side from the shelf portion 5, that is, on a region that directly receives a tensile force of the press-molding, a problem that the weakened portion is easily fractured also arises because the deformation is easily concentrated on this portion. However, in the case where a shelf portion 5 extending in the front-to-rear direction of the vehicle body is formed in a middle region in the height direction of the vertical wall portion 3 as described earlier and a weakened portion 9 is formed on one portion of the vertical wall portion 3 on the vehicle-body front side or on the further vehicle-body upper side of the shelf portion 5 at the time of molding the aluminum extrusion shaped member as described earlier, since the tensile force at the time of press-molding is supported by a metal mold in association with this shelf portion 5, the deformation at the weakened portion 9 can be suppressed. For this reason, it is possible to achieve both of the fracture suppression at the time of press-molding and ensuring the pedestrian-protective function of the product that has been manufactured.

Figure 7A:
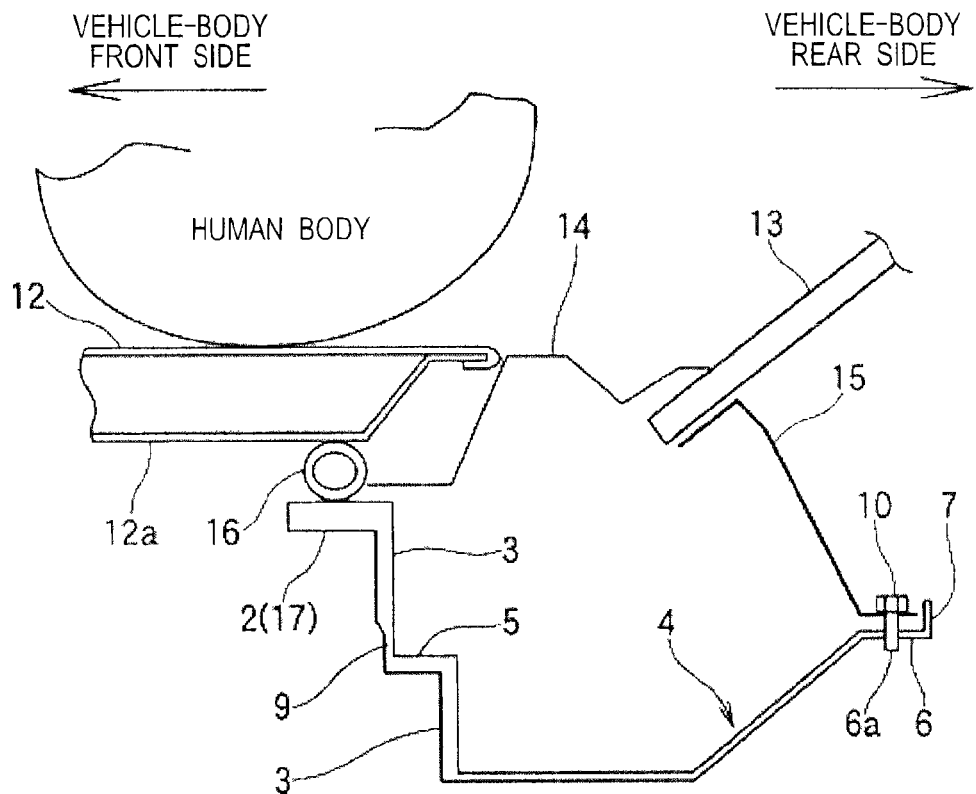
FIGS. 7A and 7B are schematic views seen from the arrow direction of X on the vertical cross-section A of FIG. 1, which indicate mutually associated relationships between the front cowl member for a vehicle and related members in accordance with the second embodiment of the present invention, where
Figure 7B:
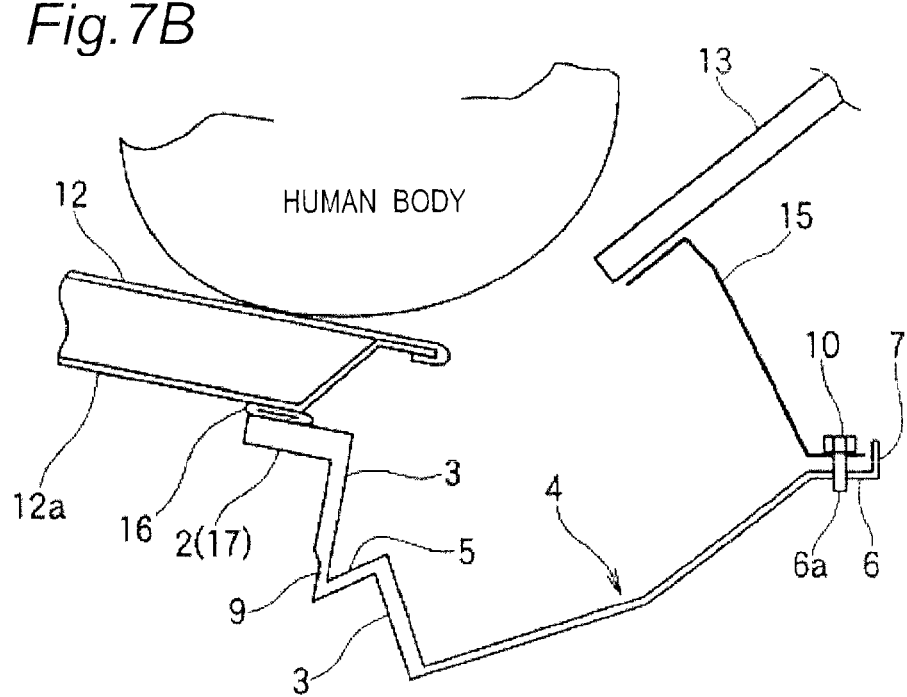
Figure 8:
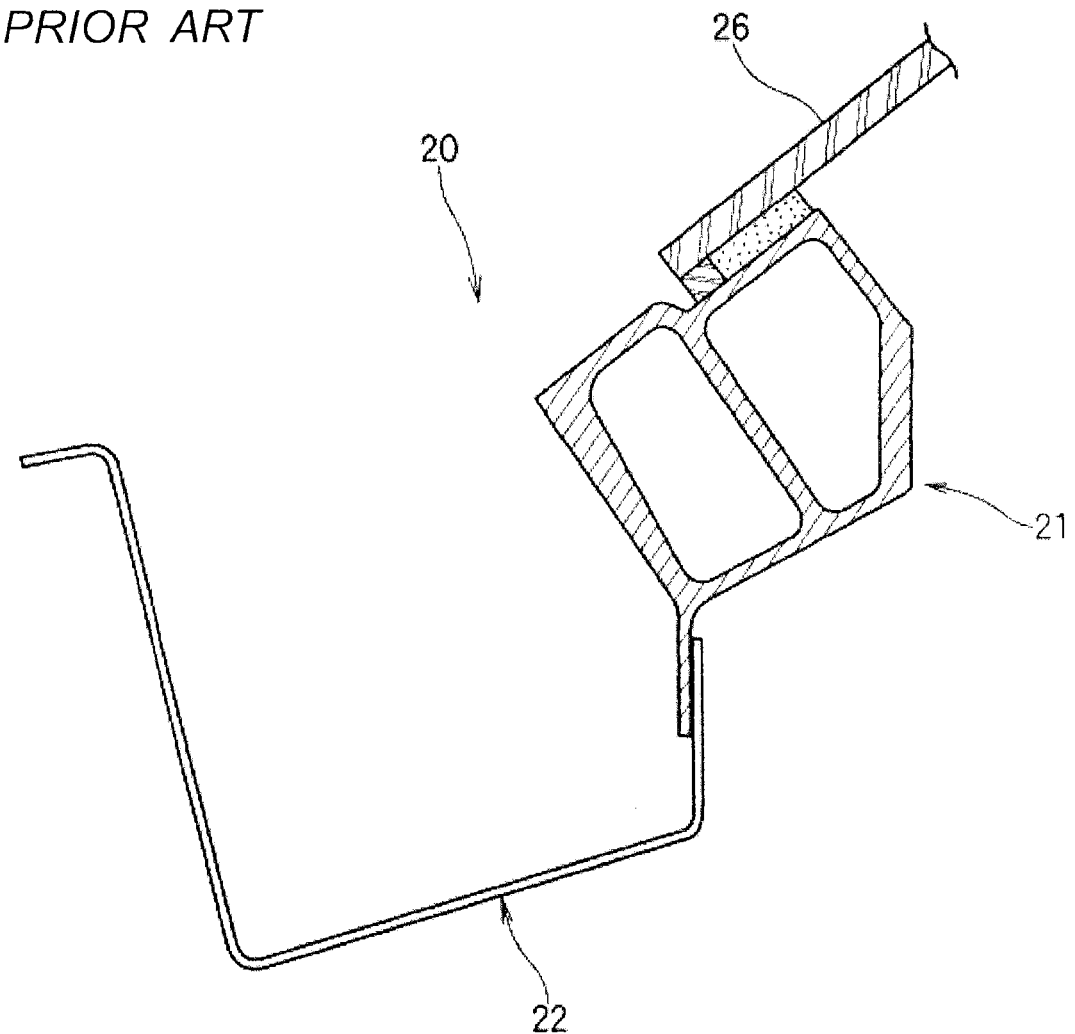
FIG. 8 is a cross-sectional view indicating a vehicle-body cowl box unit relating to prior art 1, when its cross section is seen in a vehicle width direction.

Next, referring to FIG. 7 as well as FIGS. 5 and 6 in combination, the following description will describe functions and effects of the weakened portion of the front cowl member for a vehicle in accordance with the second embodiment of the present invention. FIGS. 7A and 7B are schematic views seen from the arrow direction of X on the vertical cross-section A of FIG. 1, which indicate mutually associated relationships between the front cowl member for a vehicle and related members in accordance with the second embodiment of the present invention, FIG. 7A shows a state in which a vehicle on which the present front cowl member is mounted comes into contact with a pedestrian or the like, and the human body gets on the hood; and FIG. 7B shows a state in which the front cowl member is broken at a weakened portion, and recessed together with the hood.

Between a hood 12 that covers the upper side of the engine room on the vehicle front side in an openable/closable manner and a front glass 13 on the vehicle rear side, a cowl louver 14 made of resin, which extends in the vehicle width directions, is disposed. The front glass 13 is fixed and supported onto a cowl outer 15, and the cowl outer 15 is attached to a dash panel forming one member of the vehicle body, not shown, in the following manner.

That is, the front cowl member relating to the present invention is fixed onto suspension towers, not shown, placed on the two end portions in the vehicle-width directions of the vehicle body, by inserting bolts, not shown, through bolt holes 17a formed on the two end portions in the vehicle-width directions of the bolt joining portion 17, and is also fixed onto the dash panel, not shown, forming one member of the vehicle body together with the cowl outer 15, by inserting bolts 10 through the bolt holes 6a of the bolt joining face 6 formed on the vehicle-body rear side of the rear flange portion 4. A stopper 7 has such a function as to temporarily stop the cowl outer 15 supporting the front glass 13, when the cowl outer 15 is attached to the dash panel together with the front cowl member.

Along the shape of the hood 12 of the engine room that is formed into a convex shape in accordance with a curvature variation in the vehicle width directions, the front cowl member is formed into a convex shape in accordance with the curvature variation in the vehicle width directions. Moreover, onto the upper surface of the front flange portion 2 of the front cowl member, a rear seal 16 made of rubber, which extends in the vehicle-width directions, is attached. A hollow portion is formed on the cross section of the rear seal 16, and when the hood 12 is closed, it is made in contact with the inner panel 12a so that the hollow portion is squashed horizontally and elastically deformed.

Therefore, when the hood 12 is closed, the rear seal 16 is made in contact with the inner panel 12a without causing substantially any gap therebetween so as to seal the gap between the hood 12 and the cowl louver 14; thus, it becomes possible to prevent hot air in the engine room from externally leaking.

On the other hand, the rear flange portion 4 placed on the vehicle rear side of the front cowl member is also formed into a convex shape in accordance with the curvature variation in the vehicle width directions in the same manner as in the front flange portion 2 so as to be formed into a gutter shape in its cross-sectional shape, with an opening in the upper direction. For this reason, water droplets flowing down from the surface of the front glass 13 at the time of rain or a vehicle-washing process are received by the rear flange portion 4 having the gutter shape in its cross-sectional shape through the opening, and then allowed to flow toward the two end portions in the vehicle-width directions so as to be drained outside the vehicle.

On the other hand, since the weakened portion 9 is formed on one portion of the vertical wall portion 3 forming the front cowl member, even in the case where a vehicle on which the present front cowl member is mounted comes into contact with a pedestrian or the like, and the human body gets on the hood 12, the front cowl member is broken at the weakened portion 9, and recessed together with the hood 12 as shown in FIG. 7B so that the impact onto the human body can be alleviated.

As described above, the front cowl member for a vehicle in accordance with the present invention is formed by a press molded product of an aluminum extrusion shaped member including a front flange portion, a vertical wall portion, and a rear flange portion, and the rear flange portion is formed into a gutter shape in a cross-sectional shape, with an opening in the upper direction, when the rear flange portion is seen on the cross section that is orthogonal to the vehicle-width directions, while a bolt joining portion for use in joining with another member with a bolt is formed on one region of the front flange portion, with the bolt joining portion being designed to have a thickness that is thicker than the thickness of the rear flange portion.

As a result, by coupling the front flange portion to the suspension tower, it becomes possible to ensure bending and twisting rigidity or compression rigidity and strength of the part without using any reinforcing member, and also to cut costs by reducing the number of parts and welding costs in comparison with a conventional steel sheet structure having a reinforcing member. Moreover, by using an aluminum extrusion shaped member as a material, the part is configured by a press molding process of a different thickness extrusion shaped member so that it becomes possible to provide a thickness difference within a cross section, without using a joining, forging or cutting process, and also to ensure a product performance that is comparatively uniform within the cross section at low costs, without causing material property changes due to weld-softening and strong plastic processing.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A front cowl member for a vehicle which extends substantially in a horizontal direction relative to a vehicle body and substantially in parallel with a vehicle width direction, comprising
a press molded product of an aluminum extrusion shaped member,
wherein the press molded product comprises:
a front flange portion that extends in the vehicle width direction and is located on a front side of the vehicle body;
a vertical wall portion that is connected to a vehicle-body rear end of the front flange portion so as to extend in a vehicle-body downward direction; and
a rear flange portion that is connected to a lower end of the vertical wall portion so as to extend to a rear side of the vehicle,
wherein, when seen on a cross section orthogonal to the vehicle-width direction, the rear flange portion is formed into a gutter shape in a cross-sectional shape with an opening in an upper direction,
wherein a bolt joining portion for use in joining to another member with a bolt is formed on one region of the front flange portion, and
wherein the bolt joining portion has a thickness thicker than that of the rear flange portion.

2. The front cowl member according to claim 1, wherein the vertical wall portion has a thickness thinner than a thickness of the bolt joining portion of the front flange portion and thicker than the thickness of the rear flange portion.

3. The front cowl member according to claim 2, wherein the thickness of the bolt joining portion is twice times or more thicker than the thickness of the rear flange portion.

4. The front cowl member according to claim 1, wherein, on one region of the rear flange portion, a bolt joining face thicker than a thickness of the other regions of the rear flange portion is formed, and
wherein a bolt hole capable of being coupled to the vehicle body with a bolt is formed on the bolt joining face.

5. The front cowl member according to claim 1, wherein any one of the front flange portion, the vertical wall portion, and the rear flange portion has a slanting surface that extends between a first portion of a plate face having a first thickness and a second portion of the plate face having a second thickness, wherein the first thickness and the second thickness are different from each other, and
wherein the slanting surface is designed to have an angle change on a plate cross section in a range from 5 degrees or more to 45 degrees or less.

6. The front cowl member according to claim 1, wherein when the aluminum extrusion shaped member is molded, a shelf portion extending in a front-to-rear direction of the vehicle body is formed in a middle region in a height direction of the vertical wall portion, with a weakened portion being formed on the vertical wall portion on the front side of the vehicle body or on a vehicle-body upper side of the shelf portion.

7. The front cowl member according to claim 1, wherein the aluminum extrusion shaped member is made of an aluminum alloy of any one of 5000 series, 6000 series, and 7000 series.

* * * * *